United States Patent
Lescoche et al.

(10) Patent No.: US 11,969,913 B2
(45) Date of Patent: Apr. 30, 2024

(54) METHOD FOR MATERIAL ADDITIVE MANUFACTURING OF AN INORGANIC FILTER SUPPORT FROM A HOT-MELT COMPOSITION AND RESULTING MEMBRANE

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

(*) Notice: Subject to any disclaimer, the term of this patent is extended or adjusted under 35 U.S.C. 154(b) by 457 days.

(21) Appl. No.: 17/297,142

(22) PCT Filed: Nov. 26, 2019

(86) PCT No.: PCT/FR2019/052808
§ 371 (c)(1),
(2) Date: May 26, 2021

(87) PCT Pub. No.: WO2020/109716
PCT Pub. Date: Jun. 4, 2020

(65) Prior Publication Data
US 2022/0016800 A1    Jan. 20, 2022

(30) Foreign Application Priority Data
Nov. 27, 2018  (FR) ........................... 1871952

(51) Int. Cl.
*B28B 1/00*  (2006.01)
*B01D 67/00*  (2006.01)
(Continued)

(52) U.S. Cl.
CPC .......... *B28B 1/001* (2013.01); *B01D 67/0074* (2013.01); *B01D 69/108* (2022.08);
(Continued)

(58) Field of Classification Search
CPC .. B28B 1/001; B01D 67/0074; B01D 69/108; B01D 67/00045; B33Y 10/00;
(Continued)

(56) References Cited

U.S. PATENT DOCUMENTS

| 5,656,168 A | 8/1997 | Millares |
| 2012/0177831 A1* | 7/2012 | Dawes ................ C04B 35/6269 427/384 |

(Continued)

FOREIGN PATENT DOCUMENTS

| CN | 105582571 A | 5/2016 |
| CN | 105984133 A | 10/2016 |

(Continued)

OTHER PUBLICATIONS

International Search Report, dated May 7, 2020, corresponding to PCT/FR2019/052807.
(Continued)

*Primary Examiner* — Nahida Sultana
(74) *Attorney, Agent, or Firm* — LADAS & PARRY LLP; Malcolm J. MacDonald, Esq.

(57) ABSTRACT

The present invention relates to a method for manufacturing at least one monolithic inorganic porous support (1) having a porosity comprised between 10% and 60% and an average pore diameter ranging from 0.5 μm to 50 μm, using a 3D printer type machine (I) to build, in accordance with a 3D digital model, a manipulable three-dimensional green structure (2) intended to form, after sintering, the monolithic inorganic porous support(s) (1).

13 Claims, 13 Drawing Sheets

(51) Int. Cl.
  *B01D 69/10*   (2006.01)
  *B33Y 10/00*   (2015.01)
  *B33Y 70/00*   (2020.01)
  *B33Y 80/00*   (2015.01)

(52) U.S. Cl.
  CPC ............... *B33Y 10/00* (2014.12); *B33Y 70/00* (2014.12); *B33Y 80/00* (2014.12)

(58) Field of Classification Search
  CPC ....... B33Y 70/00; B33Y 80/00; B29C 64/106; B29D 99/005
  See application file for complete search history.

(56) References Cited

U.S. PATENT DOCUMENTS

| | | | | |
|---|---|---|---|---|
| 2012/0276325 | A1* | 11/2012 | Raffy | C04B 35/478 428/116 |
| 2013/0011304 | A1* | 1/2013 | Schumann | C04B 38/0012 55/385.3 |
| 2016/0121271 | A1 | 5/2016 | Lescoche et al. | |
| 2016/0346997 | A1* | 12/2016 | Lewis | B29C 70/06 |
| 2017/0232393 | A1 | 8/2017 | Anquetil | |
| 2019/0321890 | A1 | 10/2019 | Lescoche et al. | |
| 2021/0345643 | A1* | 11/2021 | Scionti | A23J 3/20 |
| 2022/0072764 | A1* | 3/2022 | Wood | B29C 64/209 |

FOREIGN PATENT DOCUMENTS

| | | |
|---|---|---|
| CN | 107098717 A | 8/2017 |
| EP | 3 300 817 A1 | 4/2018 |
| WO | 2015/069849 A1 | 5/2015 |

OTHER PUBLICATIONS

French Search Report, dated Oct. 22, 2019, corresponding to FR 1871947.

Chinese Office Action, dated May 16, 2022, corresponding to Chinese Application No. 201980078391X.

Indian Examination Report, dated Nov. 28, 2022, corresponding to Indian Application No. 202117027055.

Japanese Office Action, dated Nov. 14, 2023, corresponding to Japanese Application No. 2021-529776.

\* cited by examiner

[Fig. 1]
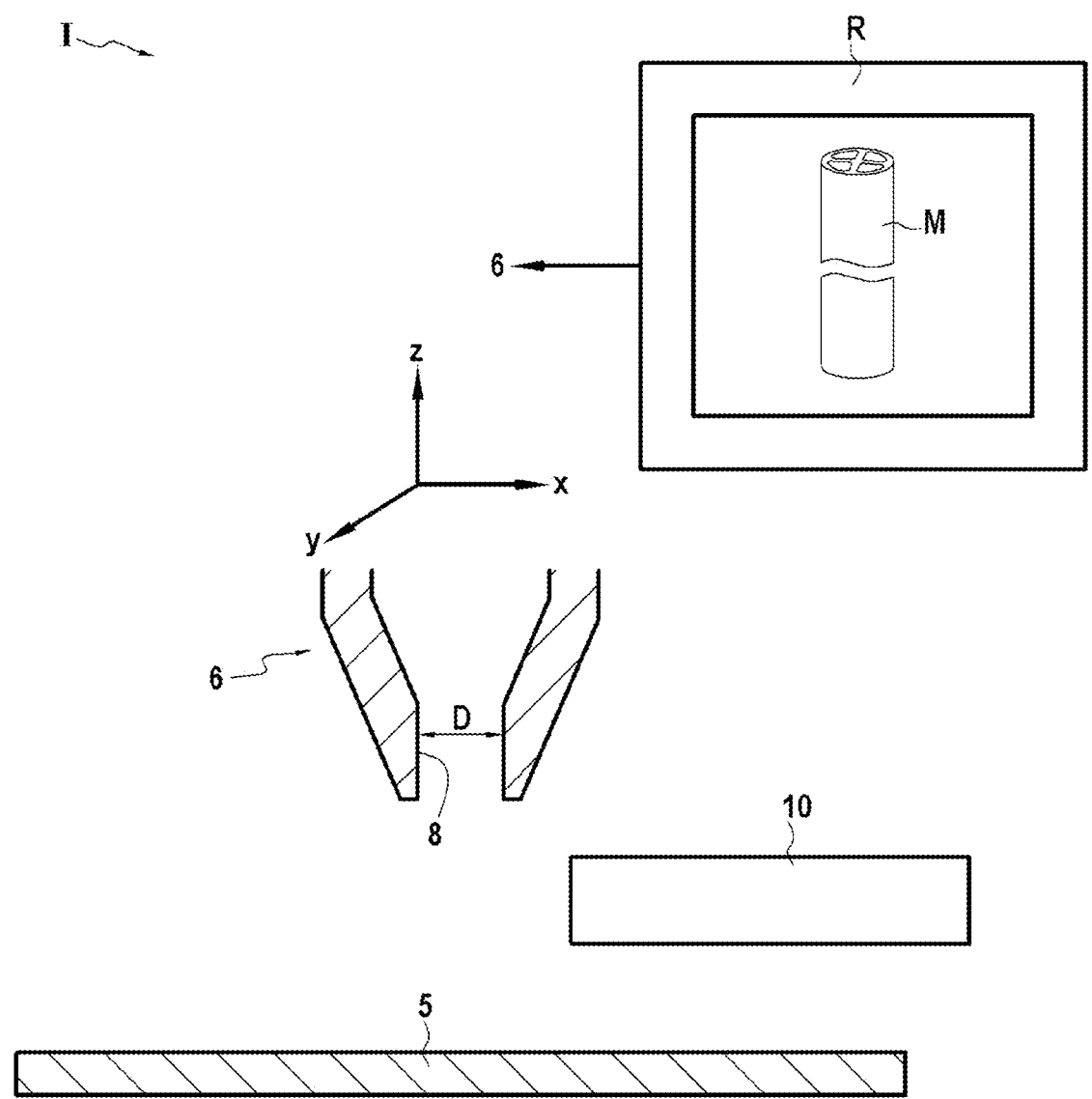

[Fig. 2]
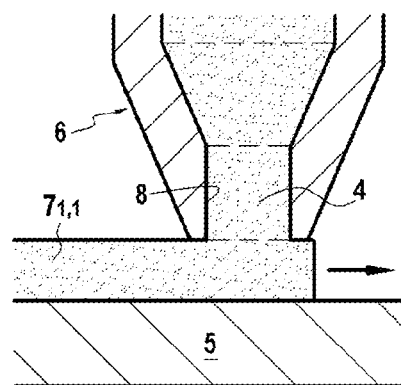
[Fig. 3]
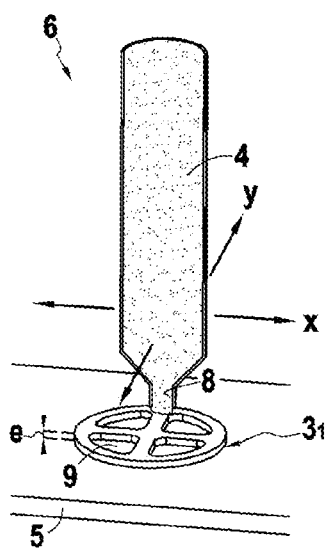

[Fig. 4]
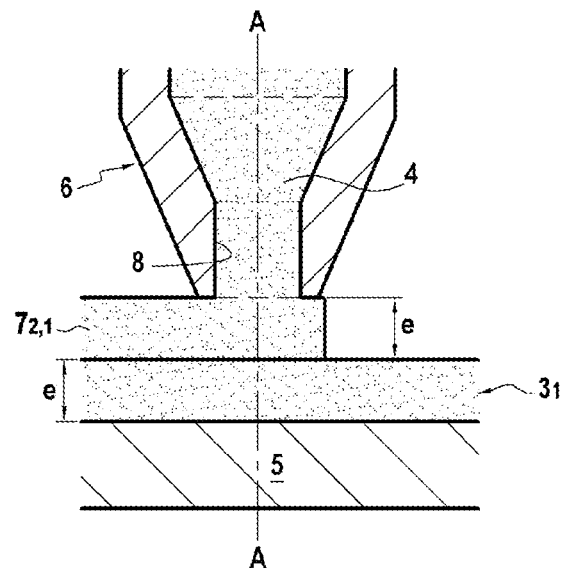
[Fig. 5]
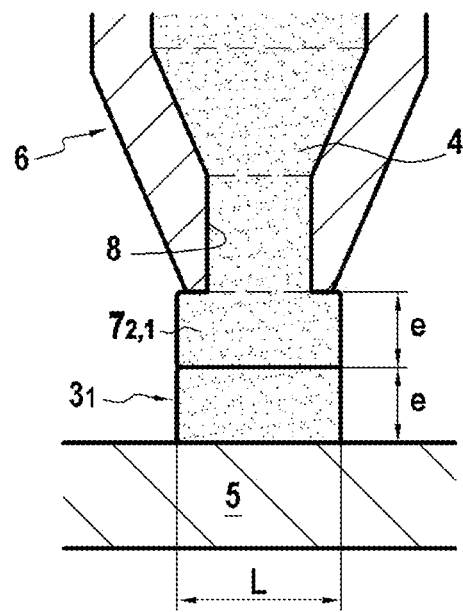

[Fig. 6]
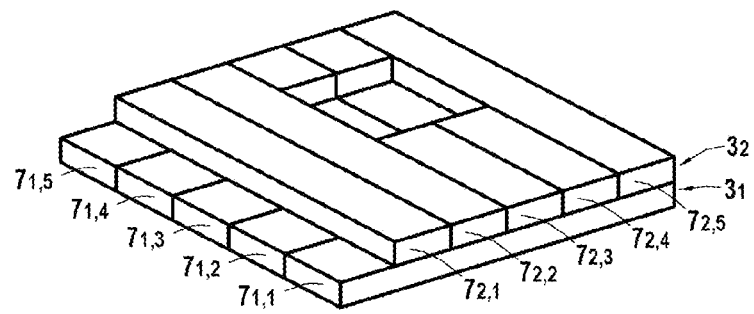
[Fig. 7]
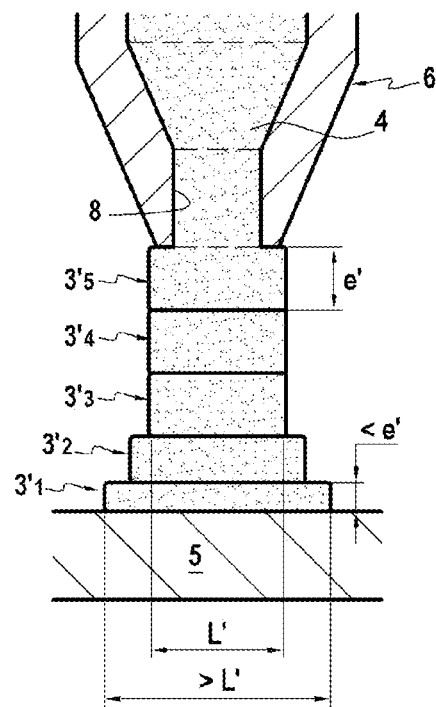

[Fig. 8]
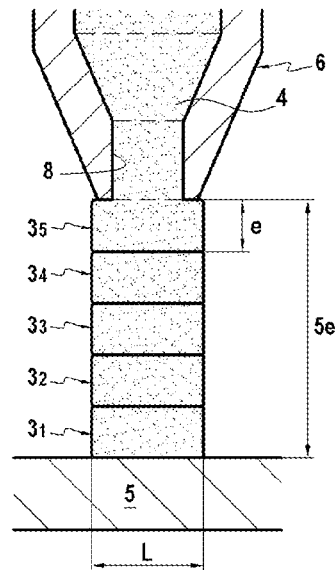
[Fig. 9]
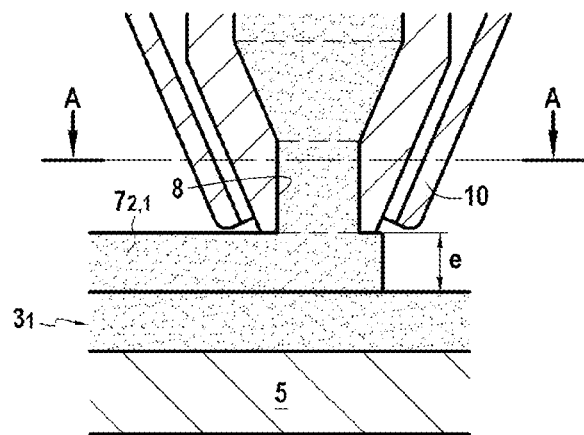
[Fig. 10A-10B]
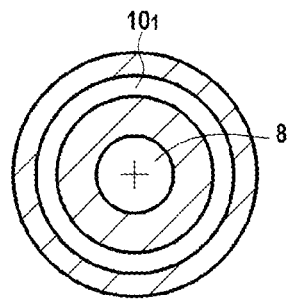
FIG.10A
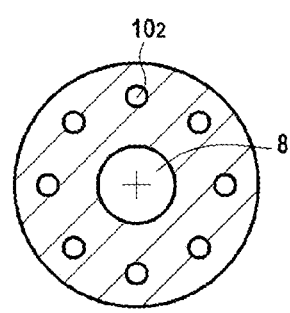
FIG.10B

[Fig. 11]
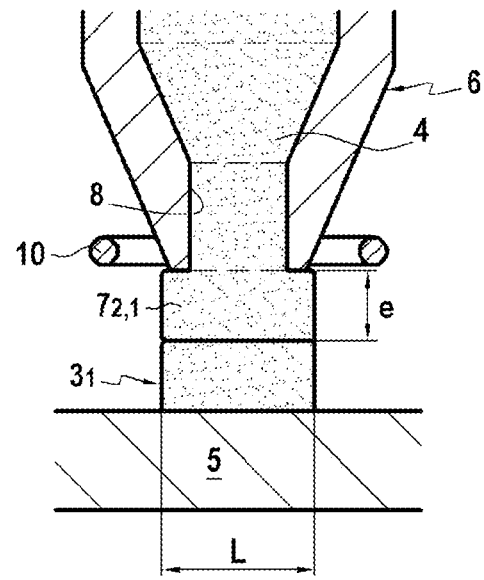
[Fig. 12A]
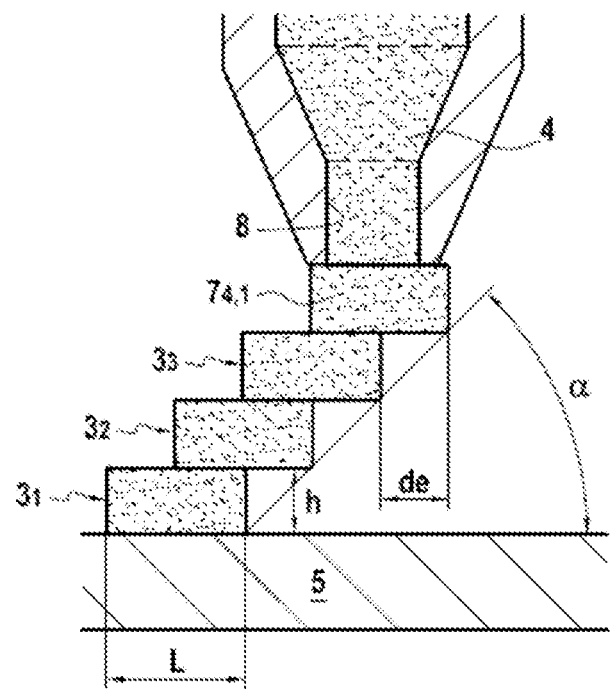

[Fig. 12B]
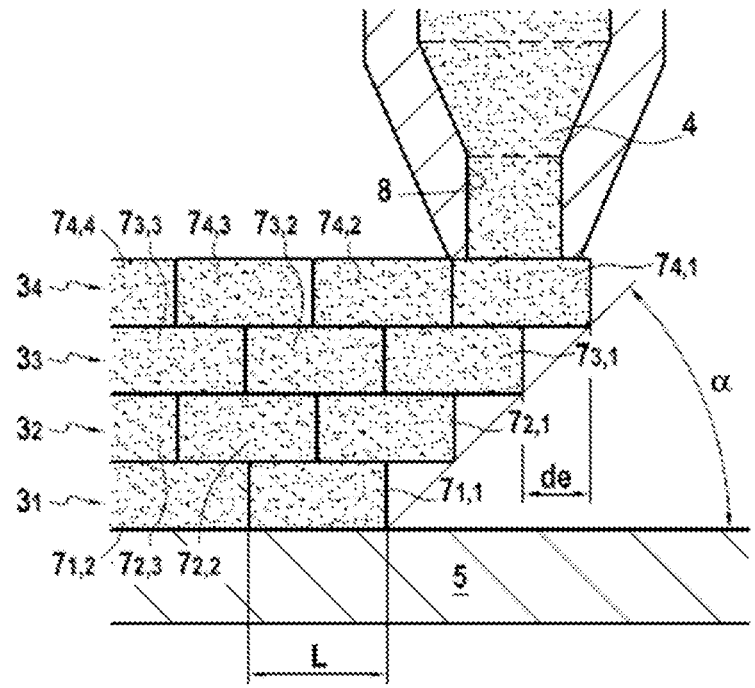
[Fig. 13]
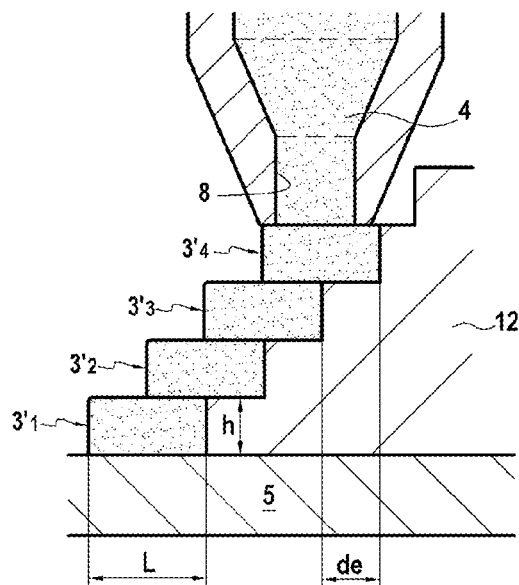

[Fig. 14]
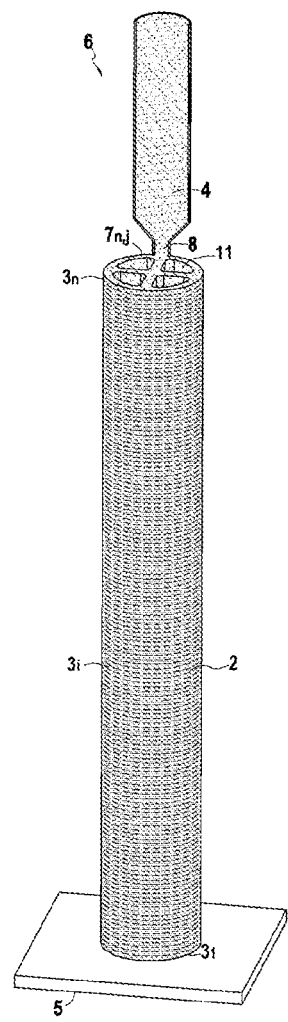

[Fig. 15]
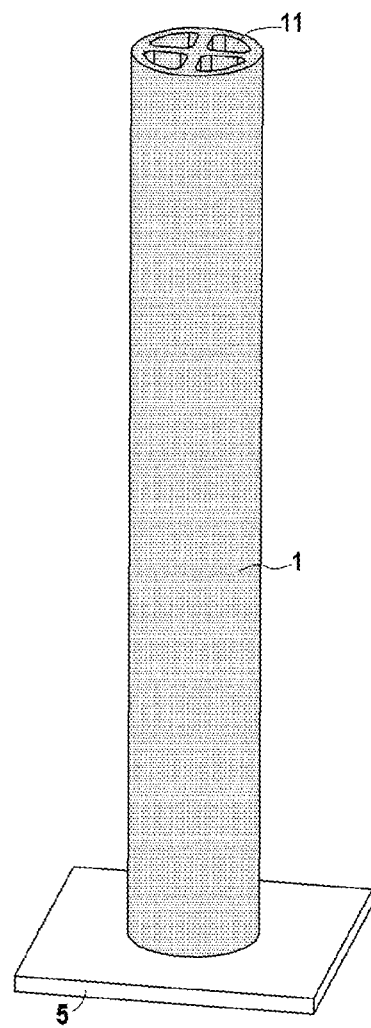

[Fig. 16A-16B]

[Fig. 17]
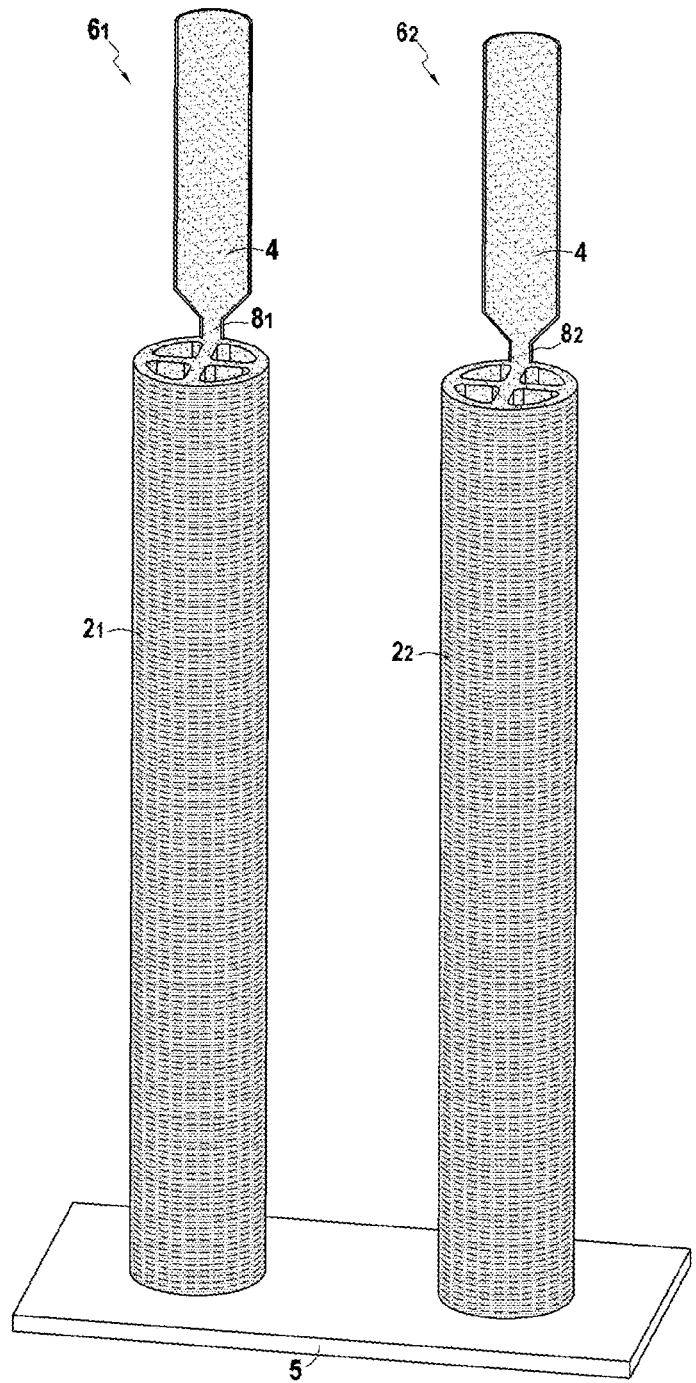

[Fig. 18]
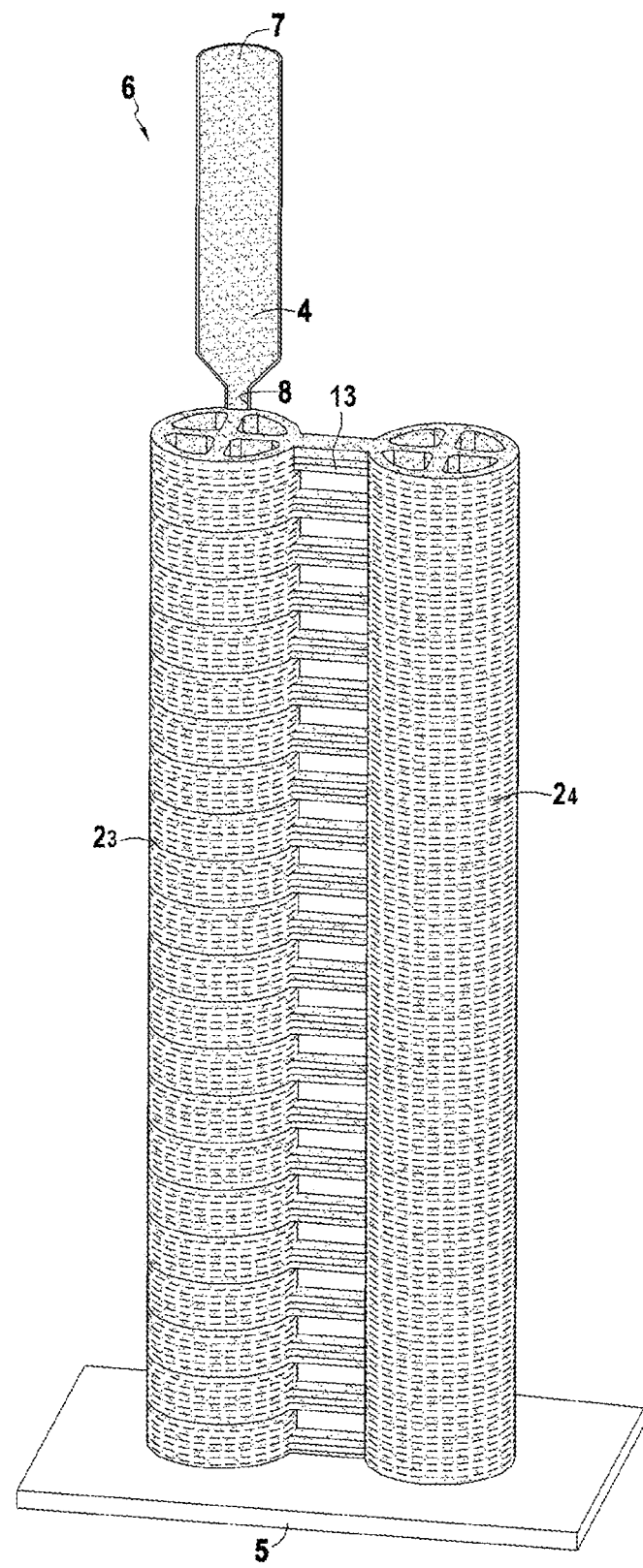

[Fig. 19]
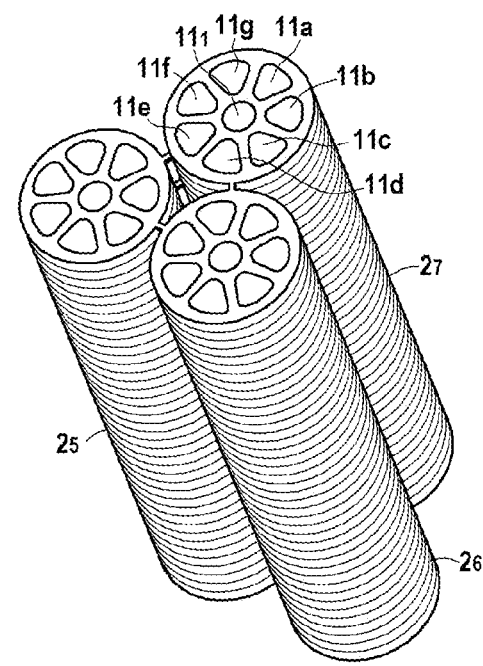

METHOD FOR MATERIAL ADDITIVE MANUFACTURING OF AN INORGANIC FILTER SUPPORT FROM A HOT-MELT COMPOSITION AND RESULTING MEMBRANE

The present invention relates to a method for manufacturing a monolithic inorganic porous support, which can in particular be used in a filtration membrane, and particularly a tangential filtration membrane. More specifically, the porous support is prepared by a technique proceeding with the addition of material.

A filtration membrane constitutes a selective barrier and allows, under the action of a transfer force, the passage or the stopping of some components of the medium to be treated. The passage or the stopping of the components can result from their size relative to the size of the pores of the membrane which then behaves like a filter. Depending on the size of the pores, these techniques are called microfiltration, ultrafiltration or nanofiltration.

A membrane consists of a porous support on which one or more separation layer(s) is/are deposited. Conventionally, the support is first manufactured by extrusion. The support then undergoes a sintering so as to achieve the required solidity, while maintaining an open and interconnected porous texture. This method requires obtaining rectilinear channels inside which the separating layer(s) is/are then deposited and sintered. The thus made membrane therefore undergoes at least two sintering operations. The organic binders added during the preparation of the paste, before its extrusion, completely burn off during the sintering of the support.

The Applicant has described in the application FR 3 006 606 the preparation of a filtration membrane whose porous support is made by an additive technique, by repeated deposition of a continuous powder bed followed by localized consolidation according to a predetermined pattern. This technique allows preparing filtration membranes that are mechanically resistant and suitable for use in tangential filtration. However, this technique has the disadvantage of requiring adjusting the fluidity of the powder to allow its perfect flow during the deposition of the powder bed. In addition, this technique requires removing the unconsolidated powder, to also possibly recycle it, which can be tricky, time-consuming and expensive, in particular when said unconsolidated powder is present in non-rectilinear channels of the porous support.

Within the framework of the invention, there is proposed a new method for preparing a porous support which does not have the drawbacks of the prior art, and particularly which is rapid, easy to implement, which allows obtaining a mechanically resistant porous support whose shape and in particular that of the non-rectilinear channels, is easily varied. For that, the method uses the technique of the 3D printing allowing obtaining a manipulable three-dimensional green structure, followed by a sintering step. The porous support obtained is homogeneous, mechanically resistant and has a porosity suitable for use in filtration, that is to say a porosity comprised between 10 and 60% and which is open and interconnected with an average pore diameter ranging from 0.5 µm to 50 µm.

The method according to the invention also has the advantage of allowing the preparation of a large-dimension monolithic porous support (that is to say a height greater than 1 m), and particularly greater than the preparation possible using an additive technique of depositing a continuous powder bed followed by a localized consolidation achieved with the machines currently on the market, and in particular described in the application FR 3 006 606.

In addition, the method according to the invention allows the preparation of a support with tilts without requiring the use of supporting means.

In this context, the present invention relates to a method for manufacturing at least one monolithic inorganic porous support having a porosity comprised between 10% and 60% and an average pore diameter ranging from 0.5 µm to 50 µm, using a 3D printing machine including at least one extrusion head movably mounted in space relative to and above a fixed horizontal plate, said 3D printing machine allowing the deposition of a string of inorganic composition to build, from a 3D digital model, a manipulable three-dimensional green structure intended to form the monolithic inorganic porous support(s), the method consisting of:

- having the inorganic composition including a first powdery solid inorganic phase in the form of particles with an average diameter comprised between 0.1 µm and 150 µm, and a second phase in the form of a matrix, comprising at least one hot-melt polymer,
- supplying the extrusion head of the 3D printing machine with the inorganic composition, said extrusion head being at a temperature allowing the extrusion of the inorganic composition to form the string,
- building, using said string on said horizontal plate, the manipulable three-dimensional green structure in accordance with the 3D digital model,
- placing this manipulable three-dimensional green structure in a heat treatment furnace in order to carry out a sintering operation at a temperature comprised between 0.5 and 1 times the melting temperature of at least one material forming the powdery solid inorganic phase.

Within the framework of the invention, the monolithic inorganic porous support can in particular be used as a filtration membrane support, and particularly as a tangential filtration membrane support.

The method according to the invention includes either or both of the following additional characteristics:

- the consolidation of the manipulable three-dimensional green structure is accelerated as said string is extruded using a consolidation device;
- the consolidation device is a controlled cooling device causing the solidification of at least one hot-melt polymer contained in the matrix;
- the manipulable three-dimensional green structure is made with a tilt without implementing a supporting means;
- the powdery solid inorganic phase comprises one or more oxides, and/or carbides and/or nitrides, and/or metals, preferably chosen among titanium oxide, aluminum oxide, zirconium oxide, magnesium oxide, silicon carbide, titanium and stainless steel, and particularly titanium oxide;
- the rheology of the inorganic composition is adjusted thanks to at least one of the following characteristics: the granularity of the powdery solid inorganic phase, the nature, and/or the proportion of the hot-melt polymer(s), the temperature of the inorganic composition;
- the manipulable three-dimensional green structure is made in the form of several three-dimensional substructures detachable from each other;
- the manipulable three-dimensional green structure is made in the form of several three-dimensional substructures connected and held together by at least one breakable bridge made using the string of inorganic composition;

several extrusion heads mounted secured to each other are moved to simultaneously make several independent three-dimensional structures each constructed by an extrusion head.

the inorganic composition is in the form of a filament or in the form of a pellet.

The invention also relates to a monolithic inorganic porous support obtainable by the method according to the invention.

The invention also relates to a method for preparing a tangential filtration membrane comprising the preparation according to the invention of a monolithic inorganic porous support in which is arranged at least one channel for the circulation of the fluid medium to be treated, followed by a step of creating one or more separating layer(s). Finally, the invention relates to a tangential filtration membrane obtainable by such a method.

Various other characteristics emerge from the description given below with reference to the appended drawings which show, by way of non-limiting examples, embodiments of the object of the invention.

FIG. 1 is a diagram illustrating the 3D printing machine used within the framework of the invention.

FIG. 2 is a sectional view of the deposition of a string of inorganic composition on the horizontal plate.

FIG. 3 is a perspective view of the deposition of a first string on the horizontal plate.

FIG. 4 is a sectional view of the deposition of a string of inorganic composition on a first stratum of inorganic composition FIG. 5 is a sectional view along the axis AA of FIG. 4.

FIG. 6 is a perspective view schematically showing two strata each composed of juxtaposed strings and deposited at 90° from one stratum to another, the strings of the first stratum being continuous and the strings of the second stratum being discontinuous to create a rectangular void.

FIG. 7 is a sectional view of a green structure excluding the invention for which a collapse phenomenon is observed.

FIG. 8 is a sectional view of a green structure according to the invention for which no collapse phenomenon is observed.

FIG. 9 is a sectional view of the deposition of a string of inorganic composition using an extrusion head integrating a convective consolidation device.

FIGS. 10A and 10B are sectional views along the axis A of FIG. 8 of the extrusion head, with a tapered annular slot (FIG. 10A) or inclined orifices (FIG. 10B).

FIG. 11 is a sectional view of the deposition of a string of inorganic composition using an extrusion head associated with a radiative consolidation device.

FIG. 12A is a sectional view illustrating one embodiment for which the three-dimensional structure has a tilt without supporting means.

FIG. 12B is a sectional view illustrating one embodiment for which the three-dimensional structure has a tilt without supporting means, and in which each stratum is formed by the juxtaposition of several strings.

FIG. 13 is a sectional view illustrating one embodiment excluding the invention for which the three-dimensional structure has a tilt with a supporting means.

FIG. 14 is a perspective view of a manipulable green structure under construction, in accordance with the invention.

FIG. 15 is a perspective view of a monolithic inorganic porous support in accordance with the invention.

FIG. 17 is a perspective view of two distinct manipulable three-dimensional green structures constructed in parallel.

FIG. 18 is a perspective view of a manipulable three-dimensional green structure formed of two detachable three-dimensional sub-structures connected by breakable bridges.

FIG. 19 is a perspective view of a manipulable three-dimensional green structure in the form of three detachable three-dimensional sub-structures connected by breakable bridges.

Figure 16A:
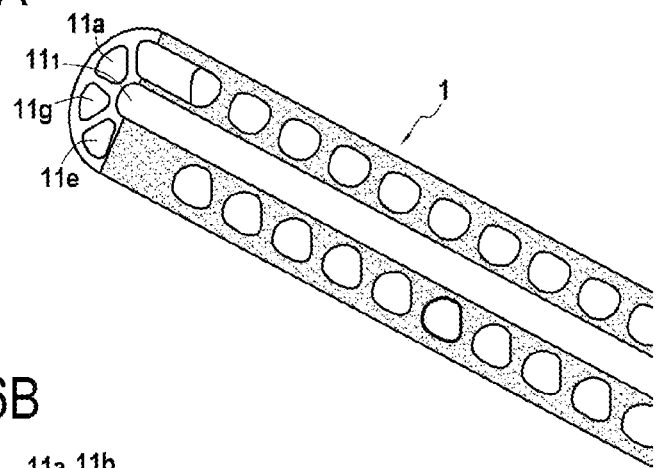
FIG. 16A is a sectional view of a monolithic inorganic porous support including a rectilinear central channel and seven helical channels wrapped around said central channel.

The invention relates to the preparation of a monolithic inorganic porous support 1, as well as a filtration membrane including the monolithic inorganic porous support 1 according to the invention comprising channels on the walls of which one or more separating layer(s) are deposited.

Within the framework of the invention, the aim is to manufacture monolithic inorganic porous supports for fluid filtration membranes, and more particularly for tangential filtration membranes. Such porous supports are generally of tubular geometry and include at least one channel or path for the circulation of the fluid to be filtered. These circulation channels have an inlet and an outlet. In general, the inlet of the circulation channels is positioned at one of the ends of the porous support, this end playing the role of inlet zone for the fluid medium to be treated and their outlet is positioned at another end of the porous support playing the role of an outlet zone for the retentate. The inlet zone and the outlet zone are connected by a continuous peripheral zone at which the permeate is recovered.

In a filtration membrane, the walls of the circulation channel(s) is/are continuously covered by at least one separating layer which filters the fluid medium to be treated. The separating layer(s) is/are porous and have an average pore diameter smaller than that of the support. The separating layer can be deposited either directly on the porous support (case of a single-layer separation layer), or on an intermediate layer with a smaller average pore diameter, itself deposited directly on the porous support (case of a multilayer separation layer). Thus, part of the fluid medium to be filtered passes through the separating layer(s) and the porous support, so that this treated part of the fluid, called permeate, flows through the external peripheral surface of the porous support. The separating layers delimit the surface of the filtration membrane intended to be in contact with the fluid to be treated and in contact with which the fluid to be treated circulates.

The porosity of the monolithic inorganic support 1 is open, that is to say it forms a network of pores interconnected in all three dimensions, which allows the fluid filtered by the separating layer(s) to pass through the porous support and to be recovered at the periphery. The permeate is therefore recovered on the peripheral surface of the porous support.

The monolithic inorganic porous support 1 has an average pore diameter ranging from 0.5 μm to 50 μm. The porosity of the monolithic inorganic porous support 1 is comprised between 10 and 60%, preferably between 20 and 50%.

By "average pore diameter" is meant the value d50 of a volume distribution for which 50% of the total volume of the pores correspond to the volume of the pores with a diameter smaller than this d50. The volume distribution is the curve (analytical function) representing the frequencies of the volumes of the pores as a function of their diameter. The d50 corresponds to the median separating into two equal parts the area located under the frequency curve obtained by mercury penetration. Particularly, the technique described in standard ISO 15901-1: 2005 can be used with regard to the mercury penetration measurement technique.

The porosity of the support, which corresponds to the total volume of the interconnected voids (pores) present in the considered material, is a physical quantity comprised between 0 and 1 or between 0% and 100%. It conditions the flow and retention capacities of said porous body. In order for the material to be used in filtration, the total interconnected open porosity must be a minimum of 10% for a satisfactory filtrate flow rate through the support, and a maximum of 60% to guarantee a suitable mechanical resistance of the porous support.

The porosity of a porous body can be measured by determining the volume of a liquid contained in said porous body by weighing said material before and after prolonged residence in said liquid (water or other solvent). Knowing the respective densities of the material considered and of the liquid used, the mass difference, converted into volume, is directly representative of the volume of the pores and therefore of the total open porosity of the porous body.

Other techniques allow accurately measuring the total open porosity of a porous body, including:
mercury intrusion porosimetry (aforementioned ISO 15901-1 standard): injected under pressure, the mercury fills the pores accessible to the implemented pressures, and the volume of mercury injected then corresponds to the volume of the pores,
small-angle scattering: this technique, which uses either a neutron radiation or X-rays, provides access to physical quantities averaged over the entire sample.
The measurement consists of the analysis of the angular distribution of the intensity scattered by the sample,
the analysis of 2D images obtained by microscopy,
the analysis of 3D images obtained by X-ray tomography.

The monolithic inorganic porous support 1 according to the invention is prepared by the sintering of a manipulable three-dimensional green structure 2, which is constructed in accordance with a 3D digital model M by the superposition of strata $3_i$ of an inorganic composition 4 using a three-dimensional printing machine I including in particular a horizontal, optionally removable, plate 5 above which at least one extrusion head 6 is disposed (FIG. 1).

By "three-dimensional green structure" 2 is meant a three-dimensional structure obtained from the superposition of strata $3_i$ of an inorganic composition 4 and which has not yet undergone a sintering. The shape and the dimensions of this green structure are determined stratum after stratum by the 3D digital model M. This three-dimensional green structure 2 is qualified as "manipulable" because it does not deform under its own weight, and may even have tilts, thanks to an accelerated consolidation which gives it a stable mechanical rigidity over time, as will be explained below. This three-dimensional green structure 2 can thus be detached from the horizontal plate 5 to be moved without deformation or break, in particular to subsequently undergo a heat treatment operation necessary to obtain a monolithic porous support in accordance with the invention.

Within the framework of the invention, a "stratum" $3_i$ is defined by a set of strings $7_{i,j}$, whether continuous or discontinuous, juxtaposed or not juxtaposed, which are extruded at the same altitude z in accordance with the 3D digital model M predefined for said altitude z (with i being an integer ranging from 1 to n, n being an integer representing the total number of strata forming the manipulable three-dimensional green structure 2 in accordance with the 3D digital model M). For reasons of clarity, most of the figures represent strata composed of a single string. However, very often within the framework of the invention, a stratum $3_i$ is formed by the juxtaposition of several continuous or discontinuous strings $7_{i,j}$.

Within the framework of the invention, a "string" $7_{i,j}$ corresponds to a strip of inorganic composition 4 which takes shape at the end of the extrusion head 6 (with i being an integer ranging from 1 to n, n being an integer representing the total number of strata forming the manipulable three-dimensional green structure 2, and j representing an integer corresponding to the string considered within the stratum to which it belongs, j ranging from 1 to m, m representing the total number of strings in the considered stratum).

The 3D digital model M is determined by computer design software, in order to construct the three-dimensional green structure 2. This 3D digital model M corresponds to a virtual structure divided into successive strata $3_i$ thanks to a slicing software which allows, if necessary, when the three-dimensional structure has tilts, defining the need for and the position of pillars to ensure a supporting means for the three-dimensional green structure under construction and prevent it from collapsing.

The extrusion head 6 of the three-dimensional printing machine I is supported by a displacement mechanism (not represented in the figures), such as a robot, allowing its displacement along at least three axes (x, y and z). Thus, the extrusion head 6 can be moved along a horizontal plane (x and y axes) and vertically (z axis), thanks to the displacement mechanism which is driven by a computer R of all types known per se. This computer R controls the movements of the displacement system and consequently of the extrusion head 6, along a predetermined path in accordance with the 3D digital model M from which the three-dimensional green structure 2 is made which allows obtaining the monolithic inorganic porous support 1 after a heat treatment operation.

The extrusion head 6 includes an inlet for the inorganic composition 4 (not represented in the figures). As represented in the figures, the extrusion head 6 also includes a calibrated flow orifice 8, such as a nozzle, movable in accordance with said 3D digital model M. According to the method for the invention, the inorganic composition 4, preferably in the form of a filament or a pellet, is introduced into the extrusion head 6 of the machine through an inlet in order to supply the flow orifice 8. A mechanical action can be applied to introduce the inorganic composition 4 into the head 6 through this inlet.

Within the framework of the invention, by "pellet" is meant a small solid element whose largest dimension can vary from 1 mm to 1 cm, depending on the obtaining mode and on the dimensioning of the extrusion head. A pellet is made up of the various materials composing said hot-melt composition and in a proportion consistent therewith. A pellet can be obtained, after an appropriate premixing of the various components, either by hot extrusion, or by compaction, or by dehydration or more generally evaporation of a liquid phase having served for said premixing. The shape of the pellets can vary depending on their obtaining mode:
small cylinders in the case of the hot extrusion,
small spherical-shaped tablets (pellets) or the like, in the case of the compaction,
small shapeless blocks in the case of the evaporation of a liquid phase (crushing of a dry "cake").

Within the framework of the invention, by "mechanical action" is meant the application of a pressure by any known technical means, such as, for example, a piston, a pump or an extruder. This step can be carried out in the usual way by those skilled in the art and will not be detailed here.

The flow orifice 8 is placed opposite and in the vicinity of the horizontal plate 5. The flow orifice 8 is movable, vertically (i.e. along the z axis) and horizontally (i.e. along the x and y axes), relative to the horizontal plate 5 which is fixed. The vertical and/or horizontal displacement of the flow orifice 8 relative to the fixed horizontal plate 5 allows the construction in accordance with the 3D digital model M of the manipulable three-dimensional green structure 2 bearing on the horizontal plate 5 following the extrusion of the string $7_{i,j}$ of inorganic composition 4 through the flow orifice 8.

According to the embodiment illustrated in the figures, the extrusion head 6 is provided with a flow orifice 8 of circular section. When the flow orifice 8 is of circular section, its diameter D is advantageously from 0.1 mm to 10 mm, preferably from 0.1 mm to 1 mm and preferably from 0.1 to 0.7 mm. However, the flow orifice 8 is not necessarily of circular section, and another shape could be envisaged.

The inorganic composition 4 is advantageously ceramic and/or metallic in nature. The inorganic composition 4 is composed of a powdery solid inorganic phase and a solid matrix at room temperature. The inorganic composition 4 is therefore not a powder, but is advantageously in the form of a filament or a pellet.

The powdery solid inorganic phase of the inorganic composition 4 comprises one or more solid inorganic material(s), each in the form of particles with an average diameter comprised between 0.1 μm and 150 μm.

The notion of average diameter is associated with that of particle distribution. Indeed, the particles of a powder have rarely a single or monodisperse size and a powder is therefore most often characterized by a size distribution of its particles. The average diameter then corresponds to the average of a distribution of the sizes of the particles. The distribution can be represented in different ways, such as a frequency or cumulative distribution. Some measurement techniques directly give a number-based (microscopy) or mass-based (sieving) distribution. The average diameter is a measurement of the central tendency.

The mode, the median and the average are among the most widely used central trends. The mode is the most frequent diameter in a distribution: it corresponds to the maximum of the frequency curve. The median represents the value where the total frequency of the values above and below is identical (in other words, the total number or volume of particles is the same below and above the median). The average must for its part be calculated and it determines the point where the moments of the distribution are equal. For a normal distribution, the mode, the average and the median coincide, while they differ in the case of a non-normal distribution.

The average diameter of the particles constituting an inorganic powder can be measured in particular by:
- laser light diffraction for particles ranging from 3 mm to approximately 0.1 μm,
- sedimentation/centrifugation,
- dynamic light scattering (DLS) for particles ranging from 0.5 μm to 2 nm,
- analysis of images obtained by microscopy,
- small-angle X-ray diffraction.

Most often, the inorganic composition 4 comprises as powdery inorganic material(s), alone or as a mixture, an oxide and/or a nitride and/or a carbide and/or a metal. As examples of oxides which may be suitable within the framework of the invention, mention may in particular be made of metal oxides, and particularly titanium oxide, zirconium oxide, aluminum oxide and magnesium oxide, the titanium oxide being preferred. As examples of carbides, mention may in particular be made of metal carbides, and particularly silicon carbide. As examples of nitrides which can be used, mention may in particular be made of titanium nitride, aluminum nitride and boron nitride. As examples of metals which may be suitable within the framework of the invention, mention may in particular be made of titanium and stainless steel. According to one preferred embodiment, the inorganic composition 4 comprises at least one metal oxide as powdery inorganic material, and preferably titanium oxide.

The matrix of the inorganic composition 4 consists of one or more hot-melt polymer(s). The matrix is organic in nature.

By "hot-melt polymer" is meant a polymer which softens under the effect of heat.

As examples of a hot-melt polymer that may be suitable within the framework of the invention, mention may be made of the following polymers or family of polymers, optionally functionalized, used alone or as a mixture in the matrix: polylactic acid (PLA), polyvinyl alcohol (PVA), acrylonitrile butadiene styrene (ABS), polyprolylene (PP), polyethylene, polyethylene terephthalate (PET), thermoplastic polyurethane (TPU), polyolefins, thermoplastic elastomers (TPE), polyolefin-based elastomers (TPE-O) and polycarbonate.

The mass content of powdery inorganic material(s) in the inorganic composition 4 can range from 40 to 95%, preferably between 70 and 90% by weight, relative to the total weight of the inorganic composition 4.

Within the framework of the invention, the inorganic composition 4 has a suitable rheology in terms of fluidity for its extrusion through the calibrated flow orifice 8.

Within the framework of the invention, the inorganic composition 4, preferably in the form of a filament or a pellet, is heated in the extrusion head 6 so that the hot-melt polymer(s) soften(s). Usually, only the flow orifice 8 of the extrusion head 6 is heated to soften the hot-melt polymer(s) at the flow orifice 8, then allowing the extrusion of the inorganic composition 4. The temperature of the flow orifice 8 can be adjusted depending on the hot-melt polymer(s) present in the inorganic composition 4.

Within the framework of the invention, it is possible to adjust the rheology of the inorganic composition 4 thanks to its temperature in the extrusion head, and/or the granularity of the powdery solid inorganic phase, and/or thanks to the nature of the hot-melt polymer(s) and/or thanks to their proportions.

By "granularity of the powdery solid inorganic phase" is meant the dimensions of the particles making up the powdery solid inorganic phase. The granularity is characterized by the concept of average diameter which is described above.

As represented in FIG. 2, a string $7_{1,1}$ of inorganic composition 4 is formed following the passage of the inorganic composition 4 through the calibrated flow orifice 8 thanks to a mechanical action on the inorganic composition 4 to ensure the pressure necessary for the extrusion of the inorganic composition 4.

At the outlet of the calibrated flow orifice 8, the temperature of the string $7_{i,j}$ of inorganic composition 4 decreases (possibly down to room temperature), and therefore its rigidity increases, which can allow ensuring the stability of the three-dimensional green structure. But, depending on the geometry of said three-dimensional structure, collapse phenomena may appear during building. The invention in this case provides for accelerating the stiffening of the string and of the three-dimensional structure using a device that allows a controlled cooling as will be explained later.

As illustrated in FIG. 3, as soon as the string $7_{1,j}$ of inorganic composition 4 is extruded through the flow orifice 8, the latter is deposited on the horizontal plate 5 to form a first stratum $3_1$, in accordance with the 3D digital model M predetermined by the computer design software, thanks to the horizontal displacement of the flow orifice 8 above the horizontal plate 5.

The flow orifice 8 moves horizontally, and therefore parallel to the horizontal plate 5, along a predetermined path in accordance with the 3D digital model M, to form the first stratum $3_1$. At this stage, a single stratum is formed on the horizontal plate 5. In the exemplary embodiment represented in FIG. 3, the first stratum $3_1$ has a circular shape including four orifices 9 of triangular shape with rounded angles. This shape is illustrated by way of example but is not limiting.

After the deposition of the first stratum $3_1$, the flow orifice 8 moves so that the deposited string $7_{2,1}$ forms the second stratum $3_2$ in accordance with the 3D digital model M, as represented in FIGS. 4 and 5. For that, the flow orifice 8 moves vertically (that is to say along the z axis) and horizontally (that is to say along the x and/or y axes) until the desired position. The extrusion of the inorganic composition 4 through the flow orifice 8 can be continuous or discontinuous. Thus, the second stratum $3_2$ is deposited on the first stratum $3_1$ by Zo the superposition of the string $7_{2,j}$ on the previously deposited stratum $3_1$, in accordance with the 3D digital model M.

In the example illustrated in FIGS. 4 and 5, each stratum $3_i$ includes only one string $7_{i,j}$ of ceramic composition 4, the strings being aligned from one stratum $3_i$ to the adjacent stratum $3_{i+1}$. Nevertheless, preferably, each stratum $3_i$ can be formed of several strings $7_{i,j}$. In the embodiment illustrated in FIG. 6, the strata $3_1$ and $3_2$ are each formed by the juxtaposition of five strings, respectively $7_{1,1}$, $7_{1,2}$, $7_{1,3}$, $7_{1,4}$, $7_{1,5}$ on the one hand and $7_{2,1}$, $7_{2,2}$, $7_{2,3}$, $7_{2,4}$, $7_{2,5}$ on the other hand. The strings $7_{1,1}$ to $7_{1,5}$ and $7_{2,1}$ to $7_{2,5}$ are deposited at 90° from one stratum to another. The strings $7_{1,1}$ to $7_{1,5}$ are juxtaposed and continuous. The strings $7_{2,1}$ to $7_{2,5}$ are discontinuous in order to create a rectangular-shaped void, in the illustrated example.

When the string(s) $7_{2,j}$ are deposited, thus forming the second stratum $3_2$, the previously described step of vertically and horizontally moving the extrusion head 6 is repeated as many times as necessary, in order to form the manipulable three-dimensional green structure 2 in accordance with the 3D digital model M, determined by the computer design software and the "slicing" software. The growth of the manipulable three-dimensional green structure 2 is conducted along the z axis. More specifically, the manipulable three-dimensional green structure 2 is built on the horizontal plate 5 by stacking of the strata $3_1$ to $3_n$ formed from the strings $7_{1,1}$ to $7_{n,m}$ in accordance with the 3D digital model M.

As represented in the figures, each stratum $3_i$ is characterized by a thickness e and the strings $7_{i,j}$ by a thickness e and a width L. The thickness e of a string $7_{i,j}$ is a dimension of said string $7_{i,j}$ taken between the flow orifice 8 of the extrusion head 6 and the surface of the preceding stratum $3_{i-1}$ or that of the horizontal plate 5 on which it is deposited. The thickness of the stratum $3_i$ is therefore identical to that of the string $7_{i,j}$, and each string $7_{i,j}$ has the same thickness e. The width L of the string $7_{i,j}$ is dependent on the volume flow rate of the inorganic composition 4 extruded through the calibrated orifice 8, on the speed of displacement of the calibrated orifice 8 and on the ratio e/D, D being the diameter of the flow orifice 8. In the exemplary embodiments represented in FIGS. 5 and 8, the strings $7_{i,j}$ and $7_{i+1,j+1}$ have the same width L.

The Applicant has observed that the mechanical strength of the three-dimensional green structure could in some cases be insufficient, resulting in a deformation of the three-dimensional green structure resulting from its collapse. This deformation can result from the collapse of insufficiently consolidated strata deforming under the weight of the strata deposited thereon. FIG. 7 illustrates this collapse phenomenon. The Applicant has observed that this deformation can also result from a collapse of the string immediately after its extrusion: a collapse of the string can take place directly out of the extrusion head, then generating a deformation of the cross section of the string, and in particular a final height of the string lower than the height planned in accordance with the 3D digital model. In the case where the three-dimensional structure includes a tilt, the deformation can also result from the collapse of the cantilevered string parts when the three-dimensional green structure is built without supporting means.

According to one embodiment, to avoid any collapse phenomenon, an acceleration of the consolidation is achieved prior to the sintering step in order to rapidly improve the mechanical strength of the three-dimensional green structure in accordance with the digital model M as illustrated in FIG. 8. In this case, each stratum $3_i$ keeps its initial shape and its initial dimensions over time, and particularly its initial thickness e and initial width L.

This acceleration of the consolidation can be achieved as the building of the manipulable three-dimensional green structure 2 using a consolidation device 10 which moves in a manner identical to the flow orifice 8. As illustrated schematically in FIG. 1, the consolidation device 10 is placed in the vicinity of the extrusion head 6, whether or not it is carried by the extrusion head 6. More specifically, the consolidation device 10 may or may not be secured to the extrusion head 6 or form part of the extrusion head 6. If the consolidation device 10 is not carried by the extrusion head 6, it follows its displacements. Thus, the acceleration of the consolidation is achieved as the inorganic composition 4 is extruded. Preferably, the acceleration of the consolidation is achieved as soon as the string $7_{i,j}$ at the outlet of the flow orifice 8 is extruded.

This consolidation device 10 allows accelerating the solidification of at least one hot-melt polymer comprised in the inorganic composition 4. In other words, the solidification of the hot-melt polymer(s) thanks to the consolidation device 10 is sufficiently rapid to impart a mechanical strength to the manipulable three-dimensional green structure 2, and sufficient to avoid any collapse thereof, even when it has tilts.

The controlled cooling is obtained by a consolidation device 10 which can be convective or radiative.

In the case of a convective consolidation device 10, one or more air jet(s) is/are oriented towards the string $7_{i,j}$: the cooling is then carried out only by a renewal of the atmosphere around said string $7_{i,j}$. As represented in FIGS. 9, 10A and 10B, the consolidation device 10 may be integrated with the extrusion head 6 around the flow orifice 8. The convective consolidation device 10 may be in the form of a conical annular slot $10_1$ disposed around the flow orifice 8 (FIG.

10A), or in the form of several orifices $10_2$ disposed around the flow orifice 8 (FIG. 10B).

In the case of a radiation-consolidation device 10, the device can be disposed around the flow orifice 8, being secured or not secured to the extrusion head 6, as represented in FIG. 11.

The acceleration of the consolidation can be adjusted depending on the used inorganic composition 4. Indeed, depending on the nature of the inorganic composition 4, and in particular its rheology, the acceleration of the consolidation will have to be more or less important to avoid any phenomenon of collapse of the manipulable three-dimensional green structure 2. The adjustment of the acceleration of the consolidation can be made by adapting the air stream, and/or the radiative energy generated by the consolidation device 10.

According to the embodiment represented in FIGS. 5 and 8, the strata $3_i$ are of the same shape and dimension and are aligned (i.e. stacked along the z axis). Thus, a monolithic inorganic porous support 1 including one or more rectilinear channel(s) 11 can be manufactured. This embodiment is not limiting. For example, according to the embodiments illustrated in FIGS. 12A and 12B, the different strata $3_i$ are stacked along the z axis so that the manipulable three-dimensional green structure 2 has a tilt or overhang or cantilever de resulting from a non-alignment of the string $7_{i,j}$ relative to the stratum $3_{i-1}$ on which it is deposited. The overhang angle α (corresponding to Arc tg (e/de)) represents the amplitude of the tilt: the smaller α, the greater the amplitude of the tilt.

The method of the invention, and possibly the acceleration of the consolidation of the string $7_{i,j}$ at the time of its deposition, and optionally the rheology of the inorganic composition 4, impart sufficient mechanical strength for the manipulable three-dimensional green structure 2 not to deform and be mechanically stable over time even when it has a tilt, which allows eliminating the need for supporting means 12 which is usually necessary to avoid the collapse of a three-dimensional green structure presenting a tilt (see FIG. 13 where a temporary supporting means 12 of a shape complementary to the three-dimensional structure under construction is printed simultaneously). This acceleration of the consolidation allows, for a given inorganic composition 4 and for given printing parameters (diameter of the flow orifice 8, speed of extrusion of the string $7_{i,j}$, speed of displacement of the extrusion head 6), adapting to the amplitude of the tilt. In summary, three-dimensional green structures 2 can be built without a collapse phenomenon being observed, even when this structure has a tilt and in the absence of supporting means.

The presence of at least one tilt within the manipulable three-dimensional green structure 2 allows the manufacture of a monolithic inorganic porous support 1 including at least one helical channel, as described in the application FR 3 060 410 of the Applicant. Such a porous support allows obtaining a tangential filtration membrane with a suitable geometry that allows reducing the risk of clogging of the separation layer, and therefore increasing the filtrate stream.

As illustrated in FIG. 14, the method according to the invention allows building a manipulable three-dimensional green structure 2 by stacking of the strata $3_1$ to $3_n$ in accordance with the 3D digital model M.

Finally, once the manipulable three-dimensional green structure 2 has been obtained, it is subjected to a heat treatment in order to carry out a sintering operation. For that, the manipulable three-dimensional green structure 2 is placed in a furnace whose temperature varies between 0.5 and 1 times the melting temperature of at least one of the powdery solid inorganic materials present in the inorganic composition 4 and for a sufficiently long period of time to allow the sintering of this whole manipulable three-dimensional green structure 2.

During the sintering step, the dimensions of the porous support 1 may vary relative to the dimensions of the manipulable three-dimensional green structure 2. This variation depends on the nature of the inorganic composition 4 and on the sintering conditions. The computer design software used within the framework of the invention allows anticipating this variation and the 3D digital model M is determined based on it.

The method according to the invention allows obtaining a monolithic inorganic support 1 with an interconnected porous texture suitable for use in filtration, and particularly in tangential filtration. In addition, the thus obtained monolithic inorganic porous support 1 has a mechanical resistance suitable for use in filtration, and particularly in tangential filtration. More accurately, the monolithic inorganic porous support 1 withstands an internal pressure of at least 30 bars without bursting, and preferably at least 50 bars without bursting. A burst pressure corresponds to the pressure at which a support bursts under the effect of an internal pressure applied in the channels with water.

Figure 16B:
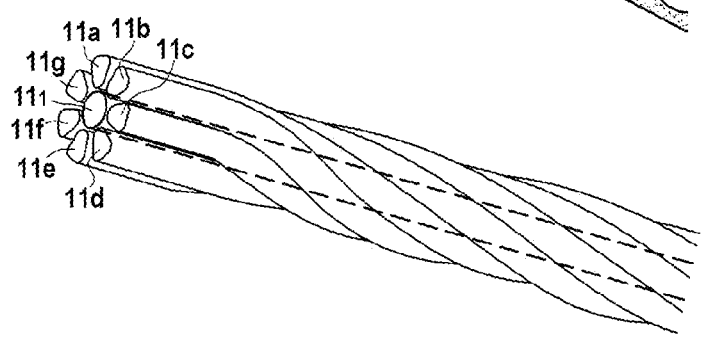
FIG. 16B is a perspective view of the channels of the support of FIG. 16A, a central channel and seven helical peripheral channels according to FIG. 16A.

The three-dimensional structure constructed can be of any shape, and particularly of elongated shape, having a circular transverse cross section, and having a cylindrical external surface as illustrated in FIG. 15. This shape is nevertheless not compulsory and another shape could be envisaged according to the desired application. Indeed, the method according to the invention allows making monolithic inorganic porous supports 1 of various shapes. Particularly, when the monolithic inorganic porous support 1 is intended to be used in a tangential filtration membrane, it includes at least one channel 11 for the circulation of the fluid to be treated, and advantageously several channels 11. These channels 11 can be rectilinear or not rectilinear, interconnected or not interconnected. In the example illustrated in FIG. 15, the monolithic porous support 1 includes four channels 11 formed by the superposition of the orifices 9 of the stacked strata $3_1$ to $3_n$, said channels 11 being rectilinear, not interconnected and of triangular section with rounded angles. The geometry and the number of channels 11 are determined by the 3D digital model M chosen, and are therefore not limited to what is illustrated in FIG. 15. For example, as illustrated in FIGS. 16A and 16B, the support may include a rectilinear central channel $11_1$, and helical channels $11_a$, $11_b$, $11_c$, $11_d$, $11_e$, $11_f$, $11_g$ forming a spiral around the rectilinear central channel $11_1$.

According to a first embodiment, the method according to the invention allows the preparation of a single manipulable three-dimensional green structure 2 at a time, resulting in a single monolithic porous support 1 at a time after sintering.

According to a second embodiment illustrated in FIG. 17, the method described above allows the simultaneous preparation of two independent manipulable three-dimensional green structures $2_1$ and $2_2$, that is to say not connected together, intended to undergo a sintering step in order to form two monolithic porous supports $1_1$ and $1_2$. For that, the machine comprises two flow orifices $8_1$ and $8_2$: each independent manipulable three-dimensional green structure $2_1$ and $2_2$ is then prepared by stacking of strata each made respectively from a string each from a separate flow orifice, respectively $8_1$ and $8_2$. In the example illustrated in FIG. 17, the two manipulable three-dimensional green structures $2_1$ and $2_2$ are of identical shape and dimensions and are constructed by an identical displacement of the flow orifices $8_1$ and $8_2$ which are preferably mounted secured to each other. However, the example illustrated is not limiting: it can be envisaged to prepare more than two manipulable three-dimensional green structures at the same time, and in particular three or four, these manipulable three-dimensional green structures being of identical or different shape and/or dimension.

According to a third embodiment, the method described above allows the preparation of a manipulable three-dimensional green structure 2 in the form of several identical or different three-dimensional sub-structures detachable from each other. According to this embodiment, the three-dimensional sub-structures are connected together by at least one breakable bridge 13, formed using the string $7_{i,j}$ of inorganic composition 4, and preferably several bridges 13 of identical or different shape and/or dimension, spaced from each other, and preferably aligned.

According to this embodiment illustrated in FIG. 18, the method according to the invention allows the manufacture of a manipulable three-dimensional green structure 2 in the form of two three-dimensional sub-structures $2_3$ and $2_4$ connected with several identical breakable bridges 13, over the entire height of the three-dimensional green sub-structures $2_3$ and $2_4$. The two three-dimensional sub-structures $2_3$ and $2_4$ are of identical shape and dimension, and include four rectilinear channels 11 of triangular transverse cross section with rounded angles.

As illustrated in FIG. 19, this third embodiment also allows the manufacture of a manipulable three-dimensional green structure in the form of three green sub-structures $2_5$, $2_6$, $2_7$ connected in series by several breakable bridges distributed over the height of the three-dimensional structure. As represented, the three green sub-structures $2_5$, $2_6$, $2_7$ are identical and include each a rectilinear central channel $11_1$ of circular section and seven helical channels $11_a$, $11_b$, $11_c$, $11_d$, $11_e$, $11_f$, $11_g$ of triangular section with rounded angles and forming a spiral around the rectilinear central channel $11_1$.

Alternatively, although not illustrated, the three-dimensional sub-structures can be connected by a single breakable bridge 13, present or not over the entire height of the manipulable three-dimensional green structure 2, and can include channels in varied number and shape. Likewise, although not illustrated, the method according to the invention allows preparing more than three detachable three-dimensional sub-structures. Although not illustrated, the three-dimensional sub-structures prepared according to this latter embodiment may be of different shape and/or dimensions.

Before the sintering step, the bridge(s) 13 connecting the three-dimensional sub-structures may be broken, allowing producing monolithic porous supports after the sintering step.

The method according to the invention has the advantage of providing constant and uniform characteristics to the monolithic inorganic porous supports 1 in a single production step, and of allowing access to a wide variety of shapes. The method according to the invention also allows preparing monolithic inorganic porous supports 1 having a tilt without requiring supporting means during its manufacture.

The invention also relates to a monolithic inorganic porous support 1 obtained by the method according to the invention. Such a support presents the advantage of having a homogeneous structure and is able to be used as a filtration membrane support.

Finally, the invention relates to the method for preparing a tangential filtration membrane, as well as a tangential filtration membrane obtained by such a method.

In the tangential filtration membrane according to the invention, the wall of the circulation channel(s) 11 arranged in the monolithic inorganic porous support 1 is covered with at least one separating filtration layer which is intended to be in contact with the fluid to be treated and to ensure the filtration of the fluid medium to be filtered. The separating layer(s) is/are created after the formation of the monolithic inorganic porous support 1. The method for preparing a tangential filtration membrane in accordance with the invention then comprises the steps of preparing a monolithic inorganic porous support 1 according to the method described above, followed by (that is to say after the final sintering step for the preparation of the monolithic inorganic porous support 1) a step of creating one or more separating filtration layer(s). This method is advantageously described in patent FR 2 723 541 in the name of the Applicant.

The creation of the separating filtration layer can be made using any technique known to those skilled in the art. Particularly, the separating layer can be deposited on the walls of the channels 11 of the support 1 by application of a suspension containing at least one sinterable composition intended, after curing, to constitute a separating filtration layer. Such a composition has a constitution conventionally used in the production of the inorganic filtration membranes. This composition contains at least one oxide, one nitride, one carbide or one other ceramic material or a mixture thereof, the oxides, the nitrides and the carbides being preferred. The sinterable composition is suspended, for example in water. To eliminate the risk of presence of aggregates and to optimize the dispersion of the grains in the liquid, the suspension obtained is ground in order to destroy the aggregates and obtain a composition composed essentially of elementary particles. The rheology of the suspension is then adjusted with organic additives to meet the hydrodynamic requirements of penetration into the channels of the supports. The separating layer, once deposited, is dried and then sintered at a temperature which depends on its nature, on the average size of its grains and on the target cutoff threshold.

This separating filtration layer deposition step is repeated in the case of a multilayer separation layer.

The membrane according to the invention has good mechanical resistance. More specifically, the membrane according to the invention has an internal pressure of at least 30 bars without bursting, and preferably at least 50 bars. An internal pressure of 50 bars is commonly accepted as being necessary and sufficient to guarantee mechanical strength of the membranes during their operation.

The invention is not limited to the described and represented examples because various modifications can be made without departing from its framework.

The invention claimed is:

1. A method for manufacturing a monolithic inorganic porous support having a porosity comprised between 10% and 60% and an average pore diameter ranging from 0.5 μm to 50 μm, using a 3D printing machine including an extrusion head movably mounted in space relative to and above a fixed horizontal plate, said 3D printing machine allowing the deposition of a string of inorganic composition to build, from a 3D digital model, a manipulable three-dimensional green structure intended to form the monolithic inorganic porous support, the method consisting of:

having the inorganic composition, said inorganic composition, including a first powdery solid inorganic phase in the form of particles with an average diameter comprised between 0.1 μm and 150 μm, and a second phase in the form of a matrix comprising a hot-melt polymer, supplying the extrusion head of the 3D printing machine with the inorganic composition, said extrusion head being at a temperature allowing the extrusion of the inorganic composition to form the string, building, using said string on said horizontal plate, the manipulable three-dimensional green structure in accordance with the 3D digital model, placing this manipulable three-dimensional green structure in a heat treatment furnace in order to carry out a sintering operation at a temperature comprised between 0.5 and 1 times the melting temperature of a material forming the powdery solid inorganic phase.

2. The method according to claim 1, wherein the consolidation of the manipulable three-dimensional green structure is accelerated as said string is extruded using a consolidation device.

3. The method according to claim 2, wherein the consolidation device is a controlled cooling device causing the solidification of a hot-melt polymer contained in the matrix.

4. The method according to claim 2, wherein the manipulable three-dimensional green structure is made with a tilt without implementing a supporting means.

5. The method according to claim 1, wherein the powdery solid inorganic phase comprises one or more oxides, and/or carbides, and/or nitrides, and/or metals, chosen among titanium oxide, aluminum oxide, zirconium oxide, magnesium oxide, silicon carbide, titanium and stainless steel, and titanium oxide.

6. The method according to claim 1, wherein the rheology of the inorganic composition is adjusted based on at least one of the following characteristics: the granularity of the powdery solid inorganic phase, the nature, and/or the proportion of the hot-melt polymer, the temperature of the inorganic composition.

7. The method according to claim 1, wherein the manipulable three-dimensional green structure is in the form of several three-dimensional sub-structures detachable from each other.

8. The method according to claim 7, wherein the manipulable three-dimensional green structure is in the form of several three-dimensional sub-structures connected and held together by a breakable bridge made using the string.

9. The method according to claim 1, wherein the inorganic composition is in the form of a filament.

10. The method according to claim 1, wherein the inorganic composition is in the form of a pellet.

11. A method for preparing a tangential filtration membrane, comprising manufacturing the monolithic inorganic porous support according to the method of claim 1, in which is arranged a channel for the circulation of the fluid medium to be treated, followed by a step of creating a separating layer on the walls of the channel.

12. A monolithic inorganic porous support prepared according to the method of claim 1 withstanding an internal pressure of at least 30 bars without bursting.

13. A tangential filtration membrane prepared according to the method of claim 11, withstanding an internal pressure of at least 30 bars without bursting.

* * * * *